United States Patent Office.

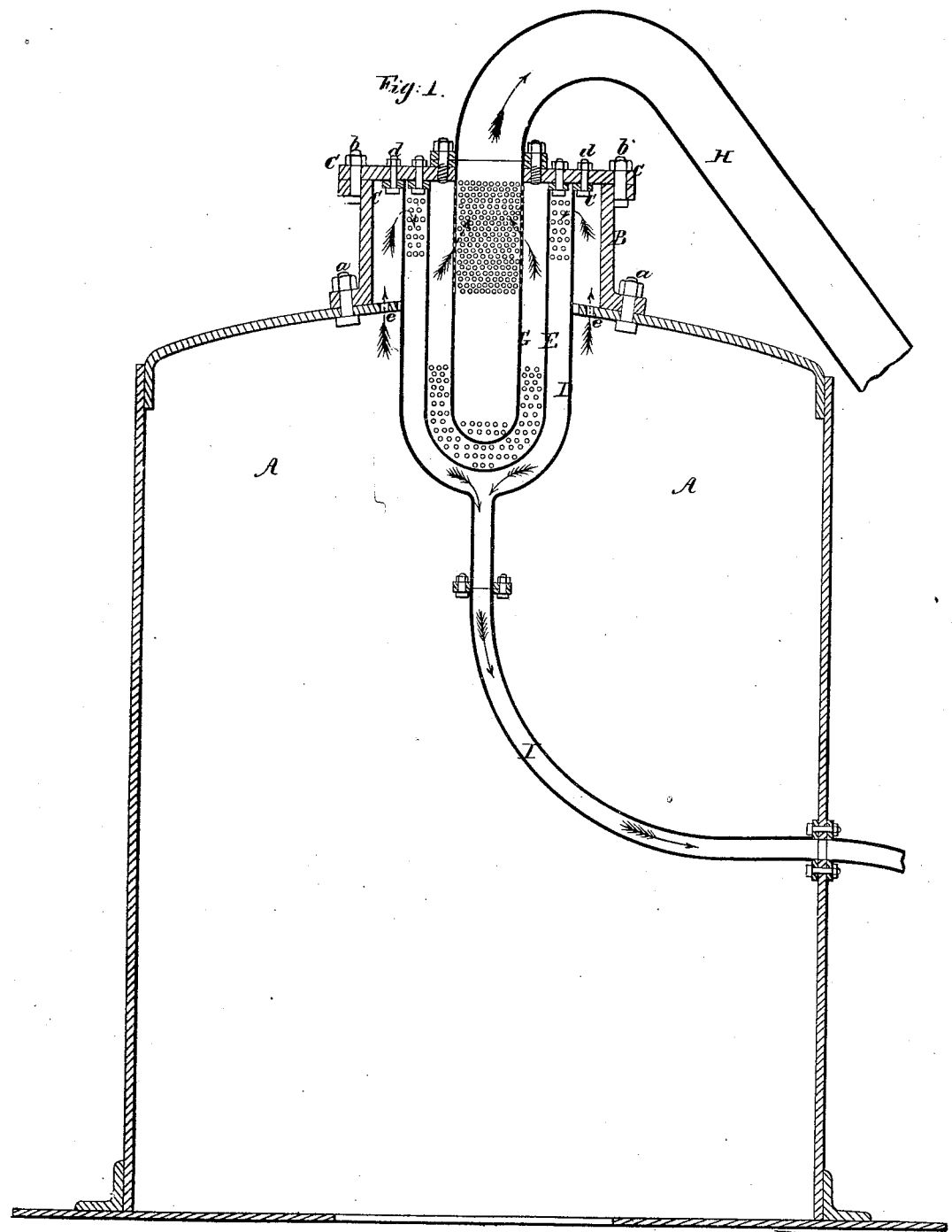

WILLIAM SAMUEL PAGE AND RICHARD EAST, OF NINE ELMS WHARF, NINE ELMS, ENGLAND.

Letters Patent No. 89,595, dated May 4, 1869.

IMPROVEMENT IN STEAM-GENERATORS.

The Schedule referred to in these Letters Patent and making part of the same.

*To all to whom it may concern:*

Be it known that we, WILLIAM SAMUEL PAGE and RICHARD EAST, of Nine Elms Wharf, Nine Elms, in the county of Surrey, England, have invented improved mechanical arrangements applicable to steam-boilers and the cylinders of steam and other motive-power engines, for preventing the priming thereof; and we do hereby declare that the following is a full and exact description thereof, reference being had to the accompanying drawing, and to the letters of reference marked thereon.

To enable others skilled in the art to make and use our invention, we will proceed to describe its construction and operation.

To the steam-chest of a boiler we affix four separate concentric chambers, or cylinders, one within the other, the said cylinders being closed at the top by a plate, except the innermost cylinder, which has a pipe connected thereto, for conveying steam to the cylinder of a steam-engine.

The bottom of the outermost cylinder has holes formed therein, for the passage of steam from the boiler, and the other cylinders are perforated at certain parts, for admitting the steam thereunto, the intention being to separate the water and other extraneous matters from the steam before it enters the cylinder of the engine, by causing the steam from the boiler to take a circuitous route, before it enters the steam-pipe leading to the engine, the water and other extraneous matters passing off by a pipe affixed to the second outermost cylinder for discharging it into the open air or water, if the boiler is a marine boiler, and, by these means, we prevent priming of the cylinders of steam-engines.

Description of the Drawing.

Figure 1 represents a transverse and vertical section of the steam-chest of a boiler, showing our improvements (also in section) adapted thereto.

The parts represented at fig. 1 are drawn to a geometrical scale of three inches to one foot.

At fig. 1, A marks the steam-chest of a boiler; B, cast-iron cylinder, bolted thereto all round, as at $a\ a$, the said cylinder being surmounted by a lid, C, bolted all round to B by bolts and nuts at $b\ b$.

D E G mark perforated copper cylinders, formed hemispherical at their lower ends, and with flanges $c\ c$ at their upper ends, for connecting them to the lid C, by bolts and nuts at $d\ d$.

H marks a pipe leading to the cylinder of an engine, for conveying the steam thereto.

I, a waste-pipe bolted to the cylinder D, and employed to carry off the waste and other extraneous matters from the cylinders D E G as they are separated from the steam.

The cylinder D is perforated all round, near the top thereof only; the cylinder E is perforated all round the bottom thereof only, and the cylinder G is perforated at top and bottom, as represented.

The arrows denoted by solid lines show the direction of the passage of the steam through the perforated cylinders D E G, as it enters the perforations $e$, formed in the top of the steam-chest, and the arrows denoted by dotted lines show the direction of the water and other extraneous matters through the pipe I.

The operations of the above arrangement are as follows:

The steam from the steam-chest being compelled to take a circuitous route through the cylinders D E G, any water and other extraneous matters that may be mixed with the steam is thus arrested and separated from the steam before it enters the pipe H, the water and other extraneous matters thus separated passing off by the pipe I, and in this manner, and by these means priming of the cylinders of steam-engines may be effectually prevented.

We would here remark that we do not intend to limit ourselves to the precise arrangement of the parts as represented by the drawing at fig. 1, but reserve to ourselves the right to place the above-mentioned arrangement either wholly inside or outside of the steam-chest, as may be found desirable in practice.

What we claim as our invention, and desire to secure by Letters Patent, is—

The series of perforated cylinders, arranged to separate the water and other extraneous matters from the steam before it enters the steam-pipe leading to the engine, substantially as above described.

W. S. PAGE.
RICHD. EAST.

Witnesses:
A. BROWNE,
HENRY A. MALLYON, } 49 *King William Street.*